United States Patent
Derham et al.

(10) Patent No.: US 8,499,327 B2
(45) Date of Patent: Jul. 30, 2013

(54) SET TOP TERMINAL PERFORMING SERVICE GROUP NUMBER AUTODISCOVERY DURING INITIALIZATION OR BOOT-UP PROCESS

(75) Inventors: Joe Derham, Coopersburg, PA (US); Don Ahrens, Roslyn, PA (US); Scott Sellers, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 697 days.

(21) Appl. No.: 11/954,953

(22) Filed: Dec. 12, 2007

(65) Prior Publication Data

US 2009/0158380 A1    Jun. 18, 2009

(51) Int. Cl.
*H04N 7/173*    (2011.01)

(52) U.S. Cl.
USPC ........... 725/116; 725/114; 725/115; 725/117; 725/118; 725/120; 725/131; 725/132; 725/133; 725/134; 725/138; 725/139; 725/140; 725/142; 725/144; 725/145; 725/146; 725/147; 725/148

(58) Field of Classification Search
USPC ................. 725/114–118, 120, 131–133, 134, 725/138–140, 142, 144–148, 151–153
See application file for complete search history.

(56) References Cited

U.S. PATENT DOCUMENTS

| | | | |
|---|---|---|---|
| 5,926,207 A * | 7/1999 | Vaughan et al. | 725/139 |
| 6,763,522 B1 * | 7/2004 | Kondo et al. | 725/39 |
| 6,807,612 B2 | 10/2004 | Jackson | |
| 7,246,366 B1 * | 7/2007 | Addington et al. | 725/93 |
| 2002/0108120 A1 | 8/2002 | Bahraini et al. | |
| 2002/0138592 A1 | 9/2002 | Toft | |
| 2002/0157106 A1 * | 10/2002 | Uskali et al. | 725/107 |
| 2003/0048380 A1 | 3/2003 | Tamura | |
| 2003/0188118 A1 | 10/2003 | Jackson | |
| 2004/0181813 A1 * | 9/2004 | Ota et al. | 725/131 |
| 2007/0022459 A1 * | 1/2007 | Gaebel et al. | 725/114 |
| 2007/0028282 A1 | 2/2007 | Kooijmans et al. | |
| 2008/0229379 A1 * | 9/2008 | Akhter | 725/139 |

* cited by examiner

*Primary Examiner* — Jason Salce
(74) *Attorney, Agent, or Firm* — Susan R. Payne

(57) ABSTRACT

A set top terminal is provided that includes a receiver having at least one tuner for receiving programming content over a content delivery system and a processor operatively associated with the receiver. The set top terminal also includes a switched digital video (SDV) application module operatively associated with the processor. The SDV application module is configured to perform an autodiscovery process by tuning to prescribed autodiscovery frequencies received by the tuner while the SDV application module is being initialized.

13 Claims, 4 Drawing Sheets

SET TOP TERMINAL PERFORMING SERVICE GROUP NUMBER AUTODISCOVERY DURING INITIALIZATION OR BOOT-UP PROCESS

FIELD OF THE INVENTION

The present invention relates generally to content delivery systems that deliver switched digital video (SDV) channels to subscribers.

BACKGROUND OF THE INVENTION

Switched digital video (SDV) refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on demand services.

As noted, switched digital video is largely a tool to save bandwidth. From the subscriber perspective, he or she still receives the same broadcast video service when using a switched broadcast technique; ideally the user is not able to discern that the stream was switched at all. If each one of the digital broadcast channels is being watched by subscribers in the same service group, the switched digital video approach does not yield any bandwidth savings. However, a more likely situation statistically is that only a certain number of the digital broadcast channels are being watched by subscribers in the same service group at any given time. Those channels not requested by a subscriber need not be broadcast, thereby saving bandwidth.

One way to support switched digital video is to utilize the session manager to manage SDV and other sessions. For each channel change, the subscriber will set up a broadcast session with the session manager, which will determine if the requested channel is already being sent to the corresponding service group that the subscriber belongs to.

The subscriber will be assigned to join the existing SDV session if the requested channel is available at the service group or assigned to a new SDV session if the requested channel is not available at the service group. The session manager will negotiate with the edge devices to allocate resources required for the session. The edge device (e.g., a digital modulator such as a QAM modulator) needs to dynamically retrieve the MPEG single program transport stream that carries the requested SDV program (likely via IP multicast or possibly IP unicast) and generate the MPEG multiple program transport stream. As part of the session setup response message, the video tuning parameters such as frequency and MPEG program number are sent back to the subscriber to access the requested SDV channel.

Each time the subscriber requests an SDV program the subscriber terminal sends a channel change request to the session manager. The channel change requests include the subscriber's service group number so that the session manager can properly identify the subscriber terminal and the edge device(s) with which it is associated. Accordingly, the subscriber terminal must be able to determine the service group to which it belongs. The subscriber terminal determines its service group using an autodiscovery process, which is performed the first time the subscriber requests an SDV channel and periodically thereafter. The autodiscovery process involves two phases. In the first phase, the subscriber terminal sequentially tunes to frequencies in a frequency plan that is specified in a configuration message which has been previously provided by the session manager. The subscriber terminal will continue to search the frequencies until it discovers the particular frequency or frequencies on which the service group number is made available. The second phase of the autodiscovery process involves, in one instance, extracting the service group number from the appropriate frequency or frequencies.

The autodiscovery process can occupy a significant amount of time because the subscriber terminal may need to search a relatively large number of frequencies before the service group number is discovered. This can cause an undue delay between the time the subscriber requests an SDV channel and the time the subscriber receives the SDV channel, thereby inconveniencing the subscriber.

SUMMARY OF THE INVENTION

In accordance with one aspect of the present invention, a set top terminal is provided that includes a receiver having at least one tuner for receiving programming content over a content delivery system and a processor operatively associated with the receiver. The set top terminal also includes a switched digital video (SDV) application module operatively associated with the processor. The SDV application module is configured to perform an autodiscovery process by tuning to prescribed autodiscovery frequencies received by the tuner while the SDV application module is being initialized.

In accordance with another aspect of the invention, the SDV application module may be configured to be initialized while the set terminal is booting-up.

In accordance with another aspect of the invention, the receiver may include a plurality of tuners and the SDV application may be configured to sequentially tune to two or more of the prescribed autodiscovery frequencies in parallel using the plurality of tuners.

In accordance with another aspect of the invention, the autodiscovery process may terminate when a service group number is extracted from a transport stream on one of the prescribed autodiscovery frequencies.

In accordance with another aspect of the invention, the autodiscovery process may terminate when a prescribed number of transport stream IDs (TSIDs) have been extracted from transport streams received on the prescribed autodiscovery frequencies sufficient to determine a service group number.

In accordance with another aspect of the invention, the SDV application module may be configured to: extract TSIDs from transport streams received on the prescribed autodiscovery frequencies, transmit the extracted TSIDs over the content delivery system, and in response thereto, receive a message over the content delivery system in which a service group number is contained.

In accordance with another aspect of the invention, a method is provided for requesting SDV programming from a content delivery system using a set top terminal. The method includes beginning a boot-up sequence during which the set top terminal is initialized. An autodiscovery process is performed by tuning to prescribed autodiscovery frequencies received by the set top terminal while an SDV application module is being initialized. A channel change request is transmitted over a content delivery system in order to receive an SDV program. The channel change request includes a service group number that is acquired based on information obtained during the autodiscovery process.

DETAILED DESCRIPTION

As detailed below, a method, apparatus and system is provided in which the time-consuming portion of the autodiscovery process used by a set top terminal to determine its service group number, tuning to the various frequencies in the autodiscovery frequency plan, is performed by a set top terminal while it is performing its internal initialization process. As a result, the service group number will be readily available when the subscriber requests an SDV channel, thereby reducing the delay between the time the subscriber requests an SDV channel and the time the subscriber receives the SDV channel.

Figure 1:
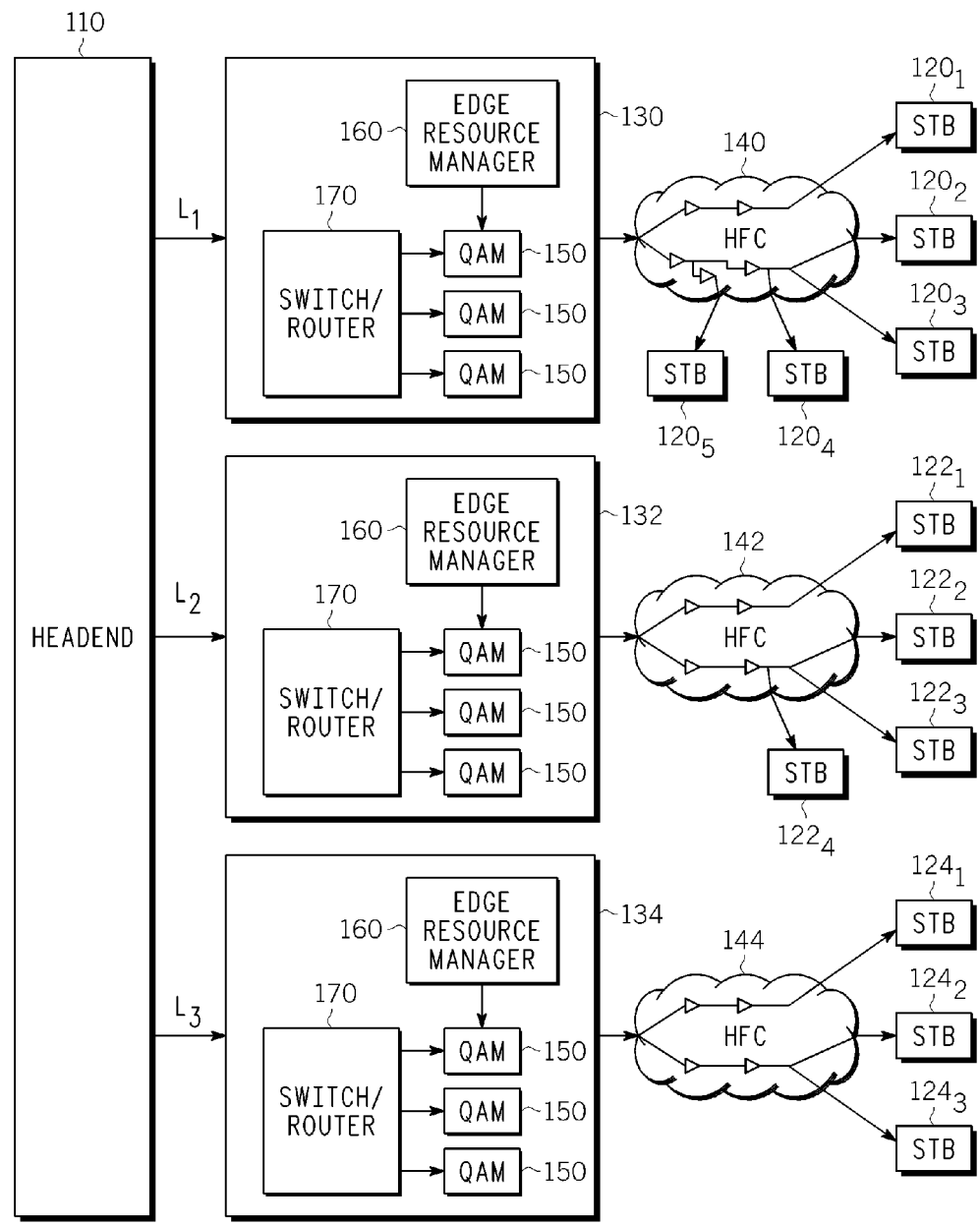
FIG. 1 shows one example of a content delivery system.

FIG. 1 is a content delivery system architecture 100 for delivering both broadcast channels and switched digital channels to a subscriber during a switched digital video (SDV) session. The SDV session is implemented through a service offering in which application level data generated by a set top terminal initiates a SDV session request and an SDV manager routes data in accordance with the request to provision the service. Among other components, system architecture 100 comprises a content distribution source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $124_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. For instance, as previously noted, the number of edge devices needed to implement SDV channels is generally much greater than the number of edge devices needed to implement broadcast channels. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110. In some cases the edge resource manager and/or session manager can be located in the headend.

Figure 2:
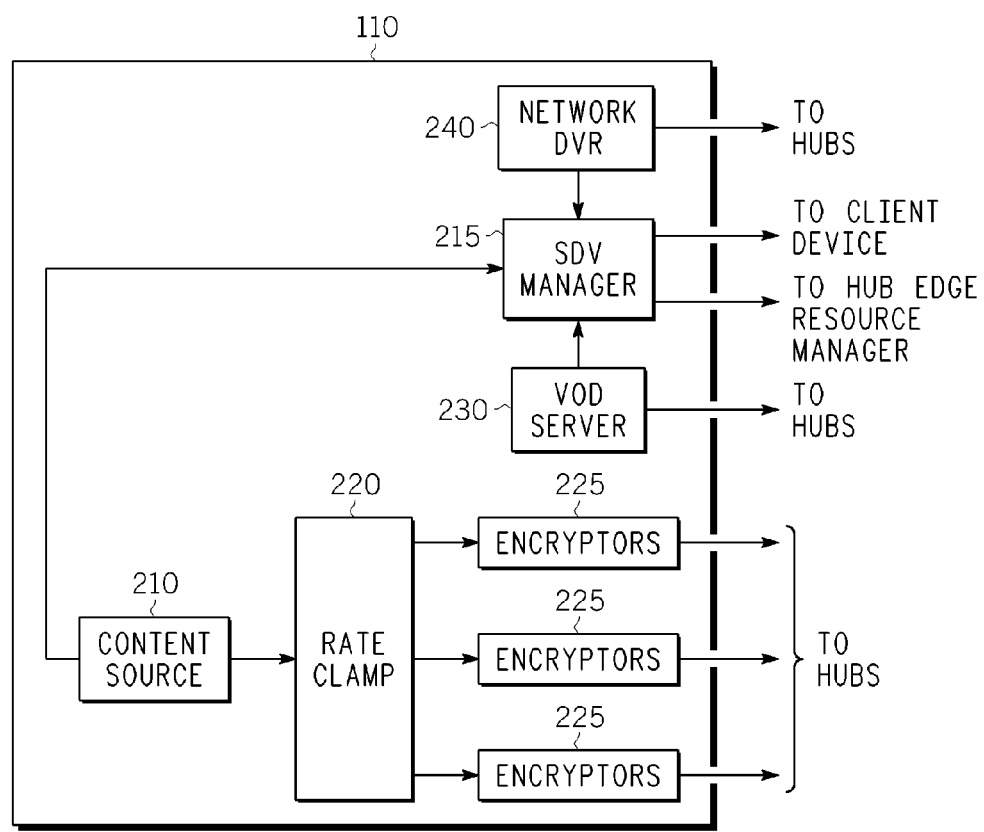
FIG. 2 shows one example of the headend depicted in FIG. 1.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

It should be noted that in some cases the functionality of some or all of the SDV manager 215 may be transferred to each of the hubs 130,132 and 134. For example, as described below, autodiscovery frequency plans and Channel Change Messages may be communicated between the set top terminals and the hubs. In addition, some or all of the functionality of the SDV manager 215 may be distributed among other components such as an SDV operations manager (SDVOM), which is sometimes used to configure and monitor SDV systems.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the head-end 110 may comprise typical head-end components and services including a billing module, an advertising insertion module, a subscriber management system (SMS), a conditional access system and a LAN(s) for placing the various components in data communication with one another. It will also be appreciated that the headend configuration depicted in FIG. 2 is a high-level, conceptual architecture and that each network may have multiple head-ends deployed using different architectures.

The edge devices 150 provide programming to the set top terminals using the downstream in-band channels. To communicate control information and the like with the headend 110 and/or the relevant hub, the set top terminals may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes SDV Channel Change Messages (CCM), which are used to send configuration information between the set top terminals and the SDV manager 215 in the headend 110. For instance, the SDV manager 215 sends the autodiscovery frequency plan to the set top terminals. Additionally, the SDV manager 215 receives channel change requests for switched digital content from a set top terminal to bind that content to a session on one of the edge devices 150 serving that set top terminal's service group. The channel change request message is generated by the SDV application (or its designated proxy) resident in the set top terminal in response to the subscriber's program channel request that is entered through the set top terminal's user interface. The SDV manager 215 responds to the set top terminal with the frequency and program number where that content may be found.

Figure 3:
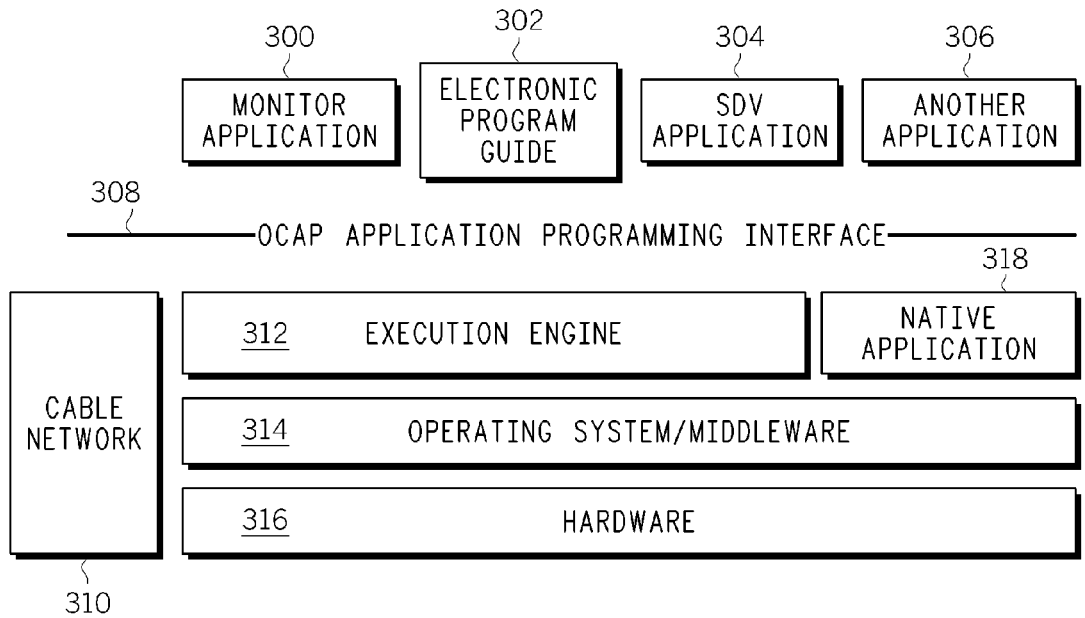
FIG. 3 shows the logical architecture of one particular example of a set top terminal.

FIG. 3 shows the logical architecture of one particular example of a set top terminal. In this example the set top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the set top terminals may be compliant with Multimedia and Hypermedia Experts Group (MHEG), Digital Television Application Software Environment (DASE) or Multimedia Home Platform (MHP) middleware. Alternatively, the set top terminal may be based on a proprietary architecture.

Referring to FIG. 3, the top of an OCAP software "stack" includes a Monitor Application 300, Electronic Program Guide (EPG) 302, SDV application 304, and any other applications 306 that may be deployed in a particular network. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the set top terminal. Examples of such Native Applications may include management of front panel functionality, remote control interaction, games, and the like. The objects downloaded to the client device in accordance with the techniques described herein may include any of the aforementioned applications and programs as well as additional applications, programs or other objects. However, during an upgrade many of the objects that need to downloaded may be directed to applications located above the OCAP application programming interface 308.

Figure 4:
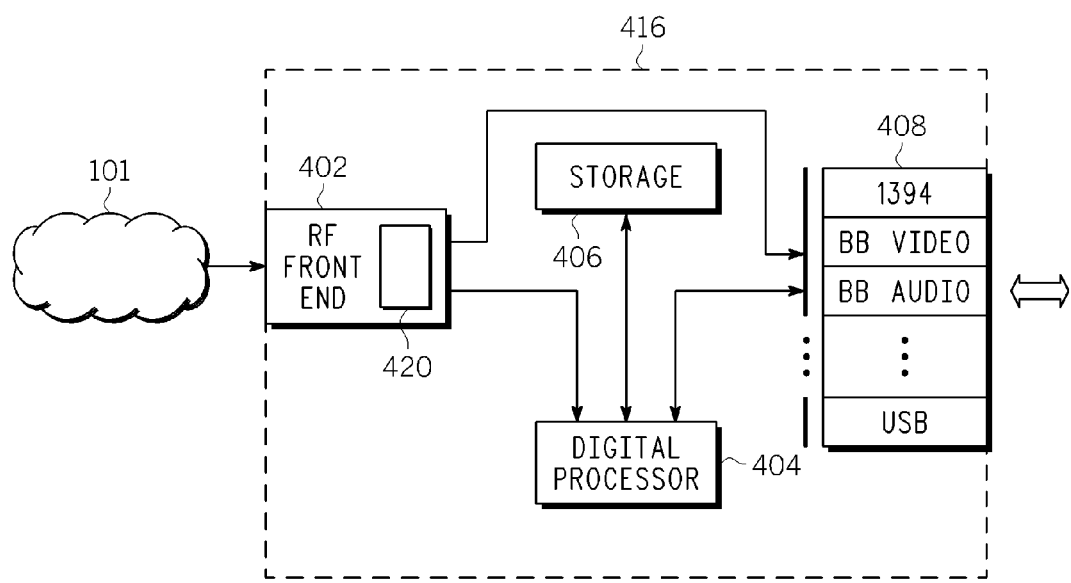
FIG. 4 shows one example of the hardware employed in the set top terminal of FIG. 3.

FIG. 4 shows one example of the set top terminal hardware 416. The device hardware 416 generally includes an RF front end 402 (including a modulator/demodulator and a tuner or tuners such as tuner 420) for interfacing with the distribution network (e.g., HFC network 140) of FIG. 1, digital processor (s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

As previously mentioned, the set top terminal performs an autodiscovery process to determine its service group number when it first requests an SDV channel. Of course, such autodiscovery processes may be used for other purposes as well. The service group number is used by the set top terminal whenever it sends a channel change request. To perform the autodiscovery process, the SDV client scans the frequencies in the frequency plan that has been provided to it in a configuration or control message received from the SDV manager when the SDV client is first initialized. There are two modes in which autodiscovery may be performed. In the first mode, the set top terminal tunes to the frequencies in the frequency plan until it finds the appropriate frequency, which is typically repeatedly transmitted either in-band or out-of-band using a protocol such as the mini-carousel protocol (MCP). Once the set top terminal finds the appropriate frequency on which the mini-carousel is operating, the set top terminal extracts the service group number, which is generally contained in a packet having a predetermined packet identifier (PID) that is known to the set top terminal.

In the second mode of autodiscovery, the set top terminal extracts the transport stream ID (TSID) when it tunes to the frequencies listed in the frequency plan. It should be noted that as used herein the term "TSID" may refer to the particular element defined in accordance with MPEG for defining an MPEG transport stream. More generally, however, as used herein the term TSID is used to refer to any identifier that can be used to uniquely identify a digital transport stream, regardless of format. The TSID is available from the Program Association Tables (PATs) located in the transport streams being transmitted on the various frequencies in the frequency plan. Accordingly, when tuning to a particular frequency, the tuning operation only needs to progress to the point where the PAT has been received. The number of frequencies that are to be searched will be the smaller of the total number of frequencies in the frequency plan and the number of different TSIDs that need to be acquired. The number of different TSIDs that need to be acquired is generally specified in the configuration message that also provided the frequency plan. Once the minimum number of TSIDs have been collected, the set top terminal sends an autodiscovery request message to the SDV manager. Based on the TSIDs, the SDV manager can determine the service group number to which the set top terminal belongs. The response from the SDV manager to the set top terminal will specify the set top terminal's service group number.

To reduce the time lag between the time the subscriber requests an SDV channel and the time the SDV channel is actually provided, instead of performing the autodiscovery process when the client requests an SDV channel, all or part of the process can be advantageously performed when the set top terminal is first initialized or booted up. The initialization or boot-up process begins when the subscriber powers up the set top terminal and requires the set top terminal to perform a series of internal self tests, after which program instructions residing in non-volatile memory are transferred to the main memory. Once the program instructions and any necessary data have been transferred to main memory, the processor then starts executing the program instructions. During the boot up sequence, video/audio is not available to the subscriber because the tuner(s) is inactive. Further, the subscriber is unable to tune to any of the channels. Control of the system is not relinquished to the viewer until the completion of the boot up sequence at which time the viewer gains full control of the set top terminal and is able to view video and tune to a desired channel.

Figure 5:
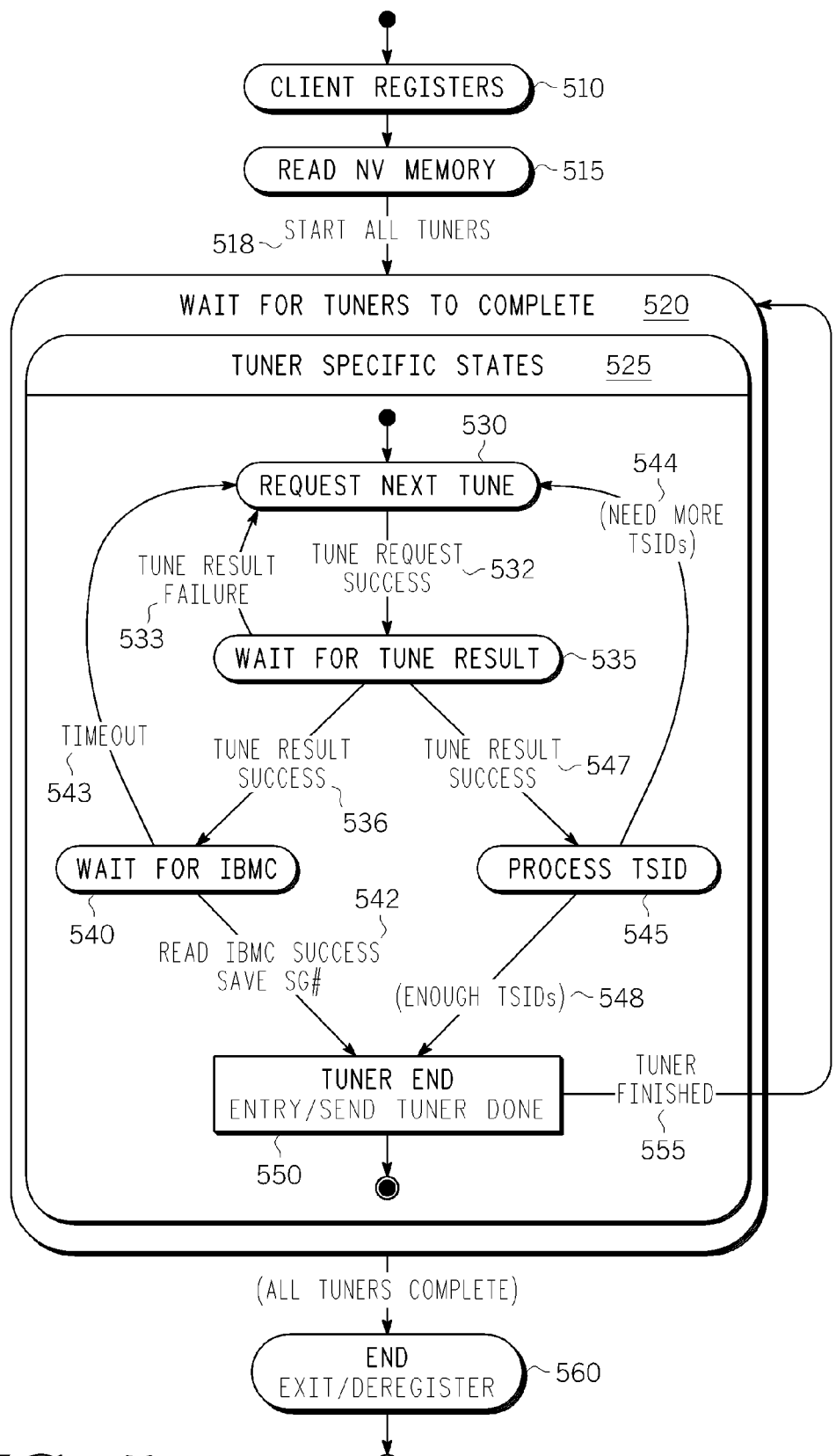
FIG. 5 is a simplified high-level state machine diagram that describes one example of the behavior of the set top terminal when it performs autodiscovery during the boot-up process.

FIG. 5 is a simplified high-level state machine diagram that describes one example of the behavior of the set top terminal when it performs autodiscovery during the boot-up process. The SDV application (e.g., SDV application 304 in FIG. 3) in the set top terminal enters the first state 510 during the initialization or boot-up process. During this state the SDV application registers with the underlying set top terminal platform (e.g., the software, middleware and hardware below the OCAP API shown in FIG. 3). During this registration state the SDV application attempts to complete a variety of tasks, including allocation of resources, obtaining set top terminal information from the platform, and connecting to out-of-band and/or in band control channels to receive configuration messages and the like. As soon as the registration or first state 510 is complete the set top terminal begins the autodiscovery process by entering a second state 515 in which the frequencies in the autodiscovery frequency plan, which may have been acquired during the first state 510, are read from non-volatile memory. The set top terminal transitions from the second state 515 to an autodiscovery superstate 520 by initiating an event 518 in which the tuner (e.g., RF-front end 402 in FIG. 4) or tuners are activated so that they can begin to search the frequencies in the frequency plan.

Upon entering the autodiscovery superstate 520 each individual tuner enters its own tuner-specific state 525, which will be described immediately below. To reduce the time needed to perform the entire autodiscovery process, the activities performed by the tuners during their respective tuner-specific states 525 may all be performed in parallel with one another. It should be noted that for purposes of generality this example assumes that the set top terminal includes two or more tuners. If only one tuner is available the process is the same except that the autodiscovery superstate 520 becomes co-extensive with the individual tuner-specific state 525.

During the tuner-specific state 525 the tuner first enters a sub-state 530 in which the tuner requests one of the frequencies in the frequency plan and attempts to tune to that frequency on the content delivery system. The tuner transitions to a sub-state 535 in which it awaits the results of the tuning operation. In order to complete the transition, a guard condition 532 may need to be satisfied, which in this case confirms that the tuning request has been successfully executed. At this point the autodiscovery process bifurcates depending on whether the tuner needs to extract TSIDS, in which case the tuner transitions to sub-state 545, or whether the tuner needs to extract the service group number directly from the appropriate frequency transmitted by a mini-carousel, in which case the tuner transitions to sub-state 540.

Turning first to the case where the tuner can extract the service group number directly, the tuner transitions from sub-state 535 to sub-state 540, during which the tuner waits until it determines whether the in-band mini-carousel (IBMC) is transmitting on the particular frequency that is currently being searched by the tuner. During the transition from sub-states 535 to 540, a guard condition 536 may need to be satisfied, which confirms that the tuner has successfully tuned to the appropriate frequency currently being searched. If this particular frequency is indeed the correct frequency on which the mini-carousel is transmitting, then the tuner transitions from state 540 to an end state 550 by satisfying the guard condition 542 in which the SDV application extracts the service group number from the appropriate packet, which as previously noted can be identified by the packet's PID. On the other hand, if a timeout period expires (guard condition 543), indicating that this particular frequency is not the correct frequency on which the mini-carousel is transmitting, then the tuner transitions from sub-state 540 back to sub-state 530 in which the next frequency in the frequency plan is searched. This process continues until the correct frequency is located and the service group number is extracted, after which the tuner transitions to the end state 550. The set top terminal, including the SDV application, completes its initialization process by signaling the superstate 520 (since guard condition 555 is satisfied) that the tuner has finished executing its state logic. When the superstate 520 determines that the last tuner finished executing its state logic, the superstate 520 transitions to state 560, during which the SDV application deregisters from the underlying set top terminal platform.

Turning now to the case where the tuner needs to extract the TSIDS from a number of frequencies in the frequency plan, the tuner transitions from sub-state 535 to sub-state 545, during which the tuner processes the transport stream received on the particular frequency that is currently being searched by the tuner. The transport stream is processed by examining the PAT, from which the TSID can be determined. During the transition from sub-states 535 to 545, a guard condition 547 may need to be satisfied, which confirms that the tuner has successfully tuned to the appropriate frequency currently being searched. Once the TSID has been extracted during sub-state 545, the SDV application determines if more TSIDs need to be acquired in accordance with the information provided to it in the configuration message. If more TSIDs are needed, the tuner transitions from sub-state 545 back to sub-state 530 (since guard condition 554 is true) in which the next frequency in the frequency plan is searched. This process continues until the correct number of TSIDs have been obtained, after which the tuner transitions to the end state 550 (since guard condition 548 is true). The set top terminal, including the SDV application, once again completes its initialization process by signaling the superstate 520 (since guard condition 555 is satisfied) that the tuner has finished executing its state logic. When the superstate 520 determines that the last tuner finished executing its state logic, the superstate 520 transitions to state 560, during which the SDV application deregisters from the underlying set top terminal platform.

Since the aforementioned processes depicted in FIG. 5 are performed while the set top box is being initialized during power-up, the service group number is either immediately available when the subscriber subsequently requests an SDV channel or the service group number can be immediately obtained by sending an autodiscover request message with the TSIDs to the SDV manager, which will respond with the service group number. In either case, the time-consuming portion of the autodiscovery process, tuning to the various frequencies in the autodiscovery frequency plan, has been already been performed while the set top terminal has been booting-up, which is already a relatively time-consuming process during which the set top terminal is largely unavailable for use by the subscriber. As a result the time lag between when the subscriber requests an SDV program and the time when the SDV program is actually received can be substantially reduced, in some cases by as much as several seconds.

It should be emphasized that the state processes depicted in FIG. 5 are presented for illustrative purposes only and that the methods, systems and techniques described herein more generally encompass any process for acquiring the information that needs to be obtained during autodiscovery.

As previously mentioned, some or all of the functionality of the SDV manager may be distributed among other components in either the headend or the hubs. For instance, while the SDV manager may provide the set top terminal with the frequencies in the frequency plan, this information alternatively may be provided by any other suitable entity.

The processes described above, including but not limited to those presented in connection with FIG. 5, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for performing an autodiscovery process by tuning to prescribed autodiscovery frequencies received by a set top terminal while the set top terminal SDV application is being initialized. As a result, the service group number will be readily available when the subscriber requests a channel, thereby reducing the delay between the time the subscriber requests an SDV channel and the time the subscriber receives the SDV channel. Among its other advantages, by performing autodiscovery during the initialization process all the tuners in the set top terminal can be utilized. In contrast, if autodiscovery is performed after the initialization process is complete, not all the tuners may be available for autodiscovery since one or more of them may be being used to provide content to the subscriber.

The invention claimed is:

1. A set top terminal, comprising:
a receiver including at least one tuner for receiving programming content over a content delivery system;
a processor operatively associated with the receiver;
a switched digital video (SDV) application module operatively associated with the processor; and
wherein the SDV application module is configured to perform an autodiscovery process by tuning to prescribed autodiscovery frequencies received by the tuner while the SDV application module is being initialized, and wherein the autodiscovery process is performed while the set top terminal is booting-up,
wherein the SDV application module is further configured to: extract TSIDs from transport streams received on the prescribed autodiscovery frequencies, transmit the extracted TSIDs over the content delivery system, and in response thereto, receive a message over the content delivery system in which a service group number is contained.

2. The set top terminal of claim 1 wherein the receiver includes a plurality of tuners and wherein the SDV application is further configured to sequentially tune to two or more of the prescribed autodiscovery frequencies in parallel using the plurality of tuners.

3. The set top terminal of claim 1 wherein the autodiscovery process terminates when a service group number is extracted from a transport stream on one of the prescribed autodiscovery frequencies.

4. The set top terminal of claim 1 wherein the autodiscovery process terminates when a prescribed number of transport stream IDs (TSIDs) have been extracted from transport streams received on the prescribed autodiscovery frequencies sufficient to determine a service group number.

5. At least one non-transitory computer-readable medium encoded with instructions which, when executed by a processor, performs a method including:
receiving a request to begin an internal initialization process during which client applications are activated;
causing information to be acquired that is sufficient to obtain a service group number by tuning to a selected number of frequencies specified in an autodiscovery frequency plan, wherein the selected number of frequencies are received over a content delivery system, wherein the information is acquired while the computer readable medium is booting up; and
causing completion of the internal initialization process by relinquishing control of the client applications to a user, wherein causing the information to be acquired further comprises:
receiving a plurality of transport streams on a plurality of the frequencies in the autodiscovery frequency plan;
extracting transport stream IDs (TSIDs) from the transport streams;

causing transmission of the extracted TSIDs over the content delivery system; and in response to transmission of the extracted TSIDs, receiving a message over the content delivery system in which the service group number is contained.

6. The computer-readable medium of claim 5 wherein the request to begin the internal initialization process is received in response to a power-up command.

7. The computer-readable medium of claim 5 wherein the client application includes an SDV application.

8. The computer-readable medium of claim 5 wherein causing the information to be acquired further comprises receiving a transport stream on one of the frequencies in the autodiscovery frequency plan and extracting the service group number from the transport stream.

9. The computer-readable medium of claim 5 further comprising receiving a configuration message in which the frequency plan is contained after beginning the internal initialization process.

10. The computer-readable medium of claim 5 wherein tuning to the selected number of frequencies further comprises sequentially tuning to two or more frequencies in parallel using two or more tuners.

11. A method of requesting SDV programming from a content delivery system using a set top terminal, comprising:

beginning a boot-up sequence during which the set top terminal is initialized;

performing an autodiscovery process by tuning to prescribed autodiscovery frequencies received by the set top terminal while a set top terminal SDV application module is being initialized; and transmitting a channel change request over a content delivery system in order to receive an SDV program, wherein the channel change request includes a service group number that is acquired based on information obtained during the autodiscovery process, wherein the autodiscovery process further comprises:

receiving a plurality of transport streams on a plurality of the prescribed autodiscovery frequencies;

extracting transport stream IDs (TSIDs) from the transport streams;

transmitting the extracted TSIDs over the content delivery system; and in response to transmission of the extracted TSIDs, receiving a message over the content delivery system in which the service group number is contained.

12. The method of claim 11 wherein the autodiscovery process is performed by sequentially tuning to two or more of the prescribed autodiscovery frequencies in parallel using a plurality of tuners in the set top terminal.

13. The method of claim 11 wherein performing the autodiscovery process further comprises receiving a transport stream on one of the prescribed autodiscovery frequencies and extracting the service group number from the transport stream.

* * * * *